United States Patent [19]

Grevich et al.

[11] 4,080,241

[45] Mar. 21, 1978

[54] BAND SEALER FOR CLOSING BAGS

[75] Inventors: John J. Grevich, Star Prairie; Stanley D. Denker, New Richmond, both of Wis.

[73] Assignee: Domain Industries, Inc., New Richmond, Wis.

[21] Appl. No.: 743,345

[22] Filed: Nov. 19, 1976

Related U.S. Application Data

[63] Continuation-in-part of Ser. No. 549,516, Feb. 13, 1975, abandoned, and Ser. No. 552,714, Feb. 24, 1975, Pat. No. 4,016,026.

[51] Int. Cl.² .................. B30B 15/34; B65B 51/18; B65B 51/32
[52] U.S. Cl. .................................. 156/498; 53/39; 53/373; 100/93 P; 100/93 RP; 100/151; 100/154; 100/211; 100/212; 156/583
[58] Field of Search ............... 156/272, 311, 380, 498, 156/499, 583; 53/28, 39, 44, 371, 373, 388; 100/93 RP, 151, 153, 154, 211, 212

[56] References Cited

U.S. PATENT DOCUMENTS

| | | | |
|---|---|---|---|
| 2,137,505 | 11/1938 | Osgood | 156/498 |
| 2,451,728 | 10/1948 | Gardner et al. | 100/93 RP |
| 2,469,972 | 5/1949 | Cowry et al. | 156/498 |
| 2,477,968 | 8/1949 | Doolin | 53/373 |
| 2,542,901 | 2/1951 | Chaffee | 156/498 |
| 2,618,426 | 11/1952 | Stover | 156/498 |
| 2,658,552 | 11/1953 | Grevich | 156/498 |
| 3,067,718 | 12/1962 | Kraft | 100/151 |
| 3,223,027 | 12/1965 | Soda et al. | 156/498 |
| 3,547,742 | 12/1970 | Cottrell | 156/583 |
| 3,791,162 | 2/1974 | Baker | 100/93 RP |
| 3,792,953 | 2/1974 | Ahweiler | 100/154 |
| 3,841,390 | 10/1974 | DiBenedetto et al. | 425/371 |

FOREIGN PATENT DOCUMENTS

256,100  5/1966  Australia.

Primary Examiner—Caleb Weston
Attorney, Agent, or Firm—H. Dale Palmatier

[57] ABSTRACT

A sealing machine for polyethylene bags, having bag clamping and conveying chains, a pair of bag heating bands, a pair of bag cooling bands downstream of the heating bands, the adjacent heat transfer runs of both the heating and cooling bands having ends offset from each other in the direction of band movement, the band mounting wheels at each end of both bands being similarly offset, the adjacent heat transfer runs of the heating and cooling bands also lying parallel and flush against each other from end to end, stationary heat bars adjacent the heat transfer runs of the heating and cooling bands at which the bars respectively generate and absorb heat, and each heat bar having a plurality of very lightly spring pressed heat transfer elements or slides continuously engaging and transferring heat between the adjacent band and heat bar.

8 Claims, 10 Drawing Figures

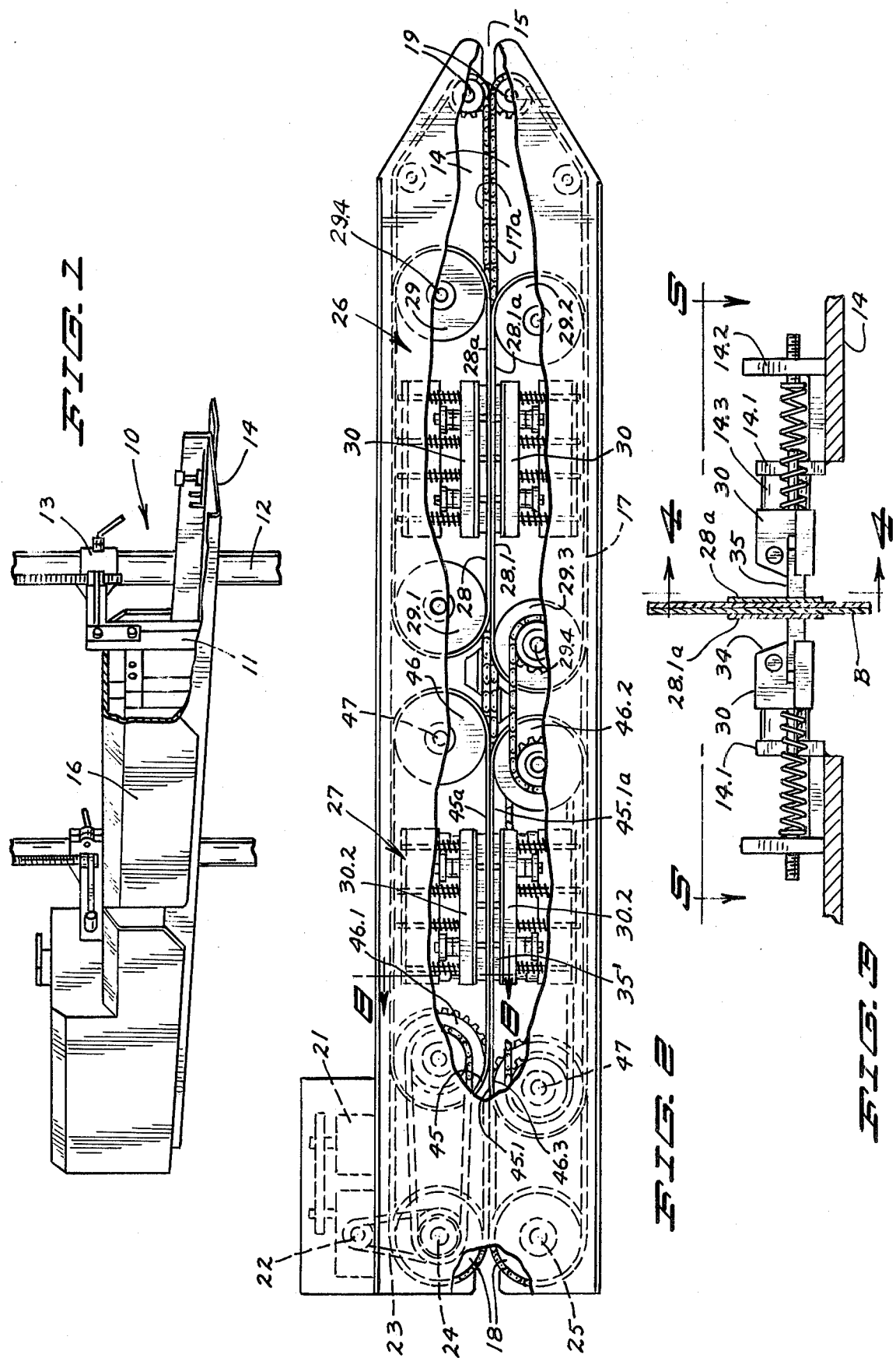

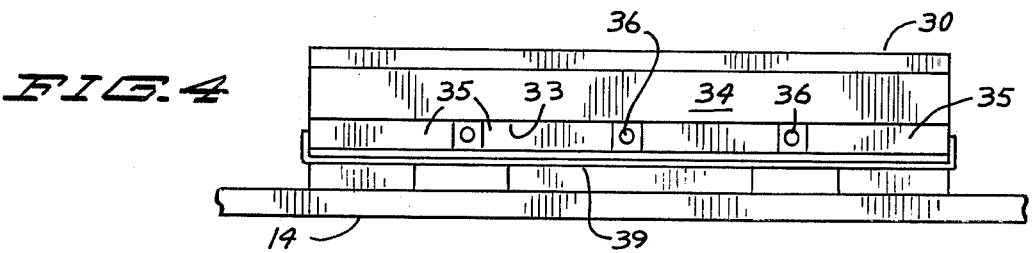
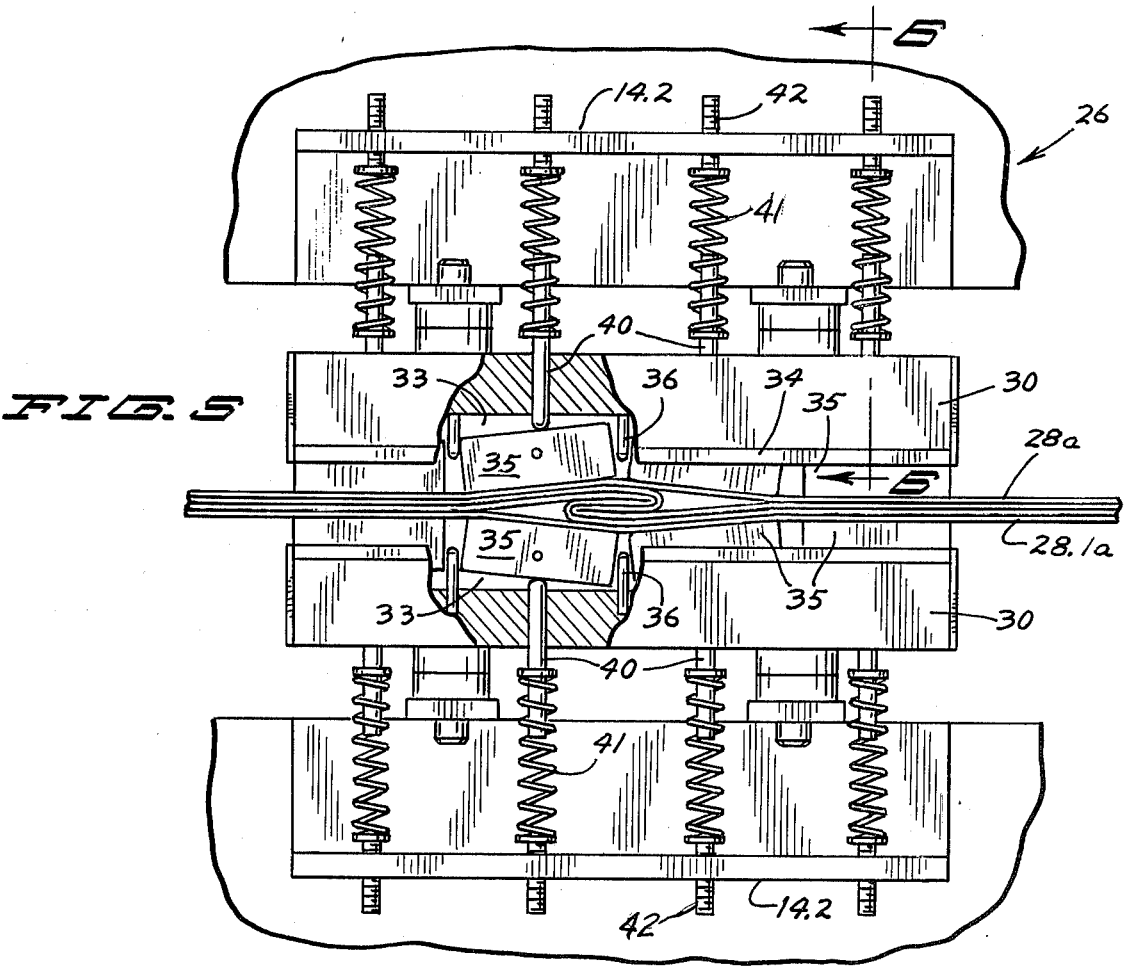
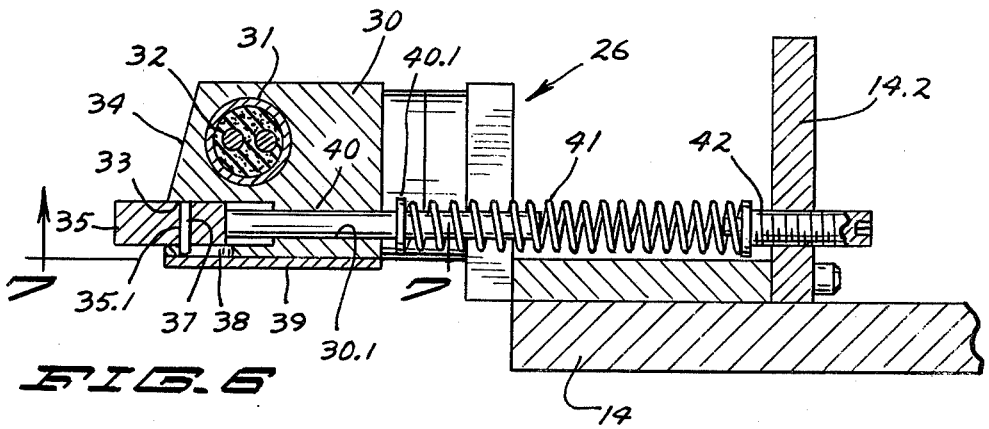

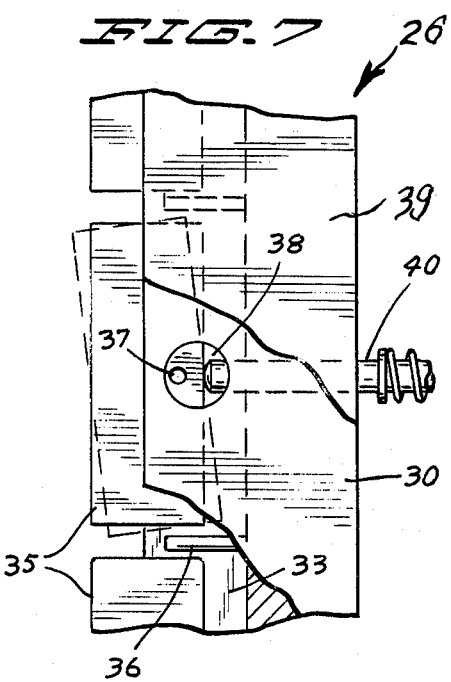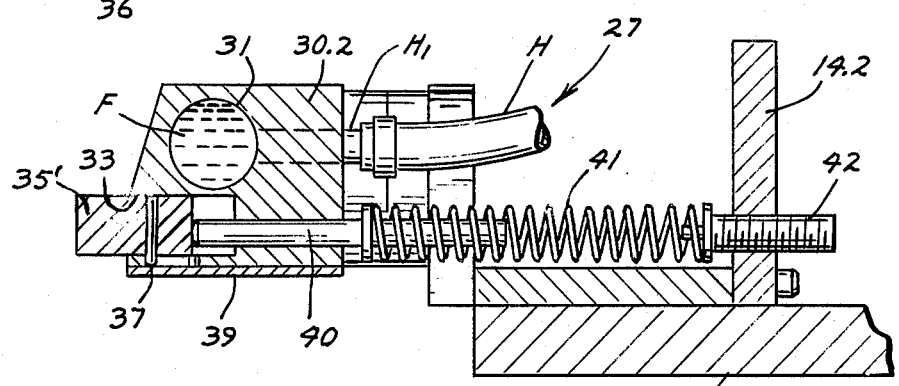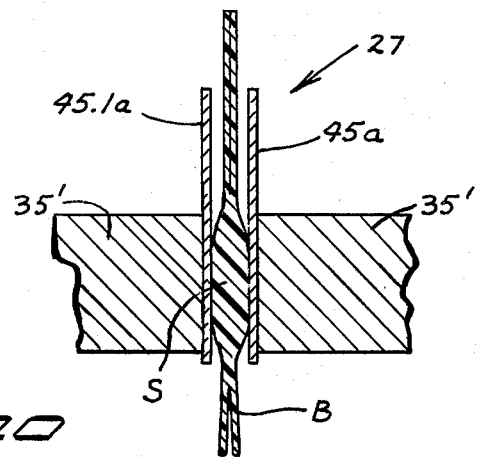

BAND SEALER FOR CLOSING BAGS

This application is a continuation-in-part of copending application Ser. No. 549,516, filed Feb. 13, 1975, abandoned, entitled "Band Sealer for Closing Bags," and also a continuation-in-part of copending application Ser. No. 552,714, filed Feb. 24, 1975, U.S. Pat. No. 4,016,026, entitled "Segmented Heater for Band Sealers."

This invention relates to a film sealing machine, oftentimes used for closing and sealing bags of polyethylene and other similar thermoplastic films. More particularly, the invention relates to a machine with confronting endless bands for carrying film laminae through a heating station and then through a cooling station.

BACKGROUND OF THE INVENTION

Such machines are referred to as band sealers or chain band sealers, and have utilized opposing endless chains for gripping and physically moving the bag tops with the bands. The bags are most generally additionally supported by an underlying belt conveyor traveling at the same speed as the bag-gripping chains and the bands through which heating and cooling of the bags is effected.

Such prior band sealers have been in commercial use for a number of years and have used a pair of endless bands arranged with film-engaging runs above the conveyor chains and confronting each other in closely spaced relation to receive and carry the film laminae therebetween. In such machines, each band has moved successively in the film-engaging run past a heating station and then past a cooling station; and subsequently the band progresses along a return run to the receiving end of the machine at which the band again repeats the cycle.

In such prior machines, each of the two bands is subjected to about 450° F. at the heating station and immediately subjected to cooling temperatures which are less than room temperatures and may be about tap water temperature of 40° – 50° F. These rapid and repeated changes of temperature cause severe internal stresses in the bands, and often cause warping and deformation in the form of wrinkling into a corrugated or "washboard" shape, and oftentimes the bands deform by bowing in a transverse direction. This warping is all the more acute because oftentimes the band is only heated along a narrow zone between the side edges of the band. Of course, such warping and deformation makes the band unusable for producing high grade seals in such film. In normal operation, such sealing bands are necessarily replaced several times a week, and in processing certain types of bag materials, the bands must oftentimes be replaced several times during each working day.

The repeated extreme heating and extreme cooling of the bands in each cycle of operation produces such a degree of warping and wrinkling of the bands that the band surfaces which are supposed to lie flush against the film being sealed, will instead in some instances bow away from the bag so that practically no heat is transferred to it, or, in other instances, a corrugated band will only engage the film material at intermittent or spaced locations so that continuous seals cannot be produced.

Such band deformation becomes extremely significant at the cooling section of such prior machines. The cooling bars must apply very significant pressure to partially flatten the band against the seal area so that heat may be extracted, and as a result production of a shrink seal in the bag is impossible. In a shrink seal, the seal zone grows in thickness as compared to the combined laminae thicknesses adjacent the seal zone, and the seal is very strong. However, because such prior machines must apply such significant pressure to the band and seal area, growth of the thickness of the seal has been impossible, and the contrary result, reduction in thickness, has oftentimes resulted.

The repeated substantial changes between such temperature extremes in each cycle of operation requires the heating bars at the heating station to apply temperatures of 400° – 450° F. to the band so as to be assured of adequate reheating of the band from its cooled condition and heating of the film to high enough temperatures to melt the film for welding or fusing to produce a seal. In exposing the film to such high temperatures, the surface of the film oftentimes becomes deformed, and the seal area of the film becomes excessively soft and weak. When the machine is run at speeds to produce reasonable output, such as up to 600 inches per minute, the cooling section cannot adequately cool the seals, and, accordingly, the film or bag must be carefully handled for a time after it emerges from the sealing machine. Such bags cannot be immediately rough handled.

Of course, this need for careful handling the sealed bags requires more room in the plant or processing area. In such prior machines, the bands continuously clamp the film as the film passes first along the heating station and then along the cooling station. As the film laminae are sealed, the seal area becomes thinner than the adjacent unsealed areas. For instance, if two 4 mil thick film laminae (totaling 8 mils in thickness) are being sealed together, the thickness at the seal zone or strip may be only approximately 6 mils in thickness. Accordingly, there is a shear line in each laminae at the edge of the seal zone where the laminae abruptly changes in thickness. The film is likely to be weakened along such a shear line, resulting in a weak seal.

In prior band sealers, coatings on the steel bands have been required to assure that the seal is released from the band at the end of the first heating-cooling run. Often the band is coated with a thin slippery plastic coating or laminae affixed to the steel band and made of such commercial product known by its trademark TEFLON. Other release agents have also been used, such as light oil, the coating of the steel bands with TEFLON or other similar materials makes the bands extremely expensive and difficult to obtain in remote locations. When the coating is worn off, the band becomes essentially useless. Such bands in prior machines have necessarily been extremely thin, approximately 0.005 of an inch thick in order to adequately perform the purpose intended. This extreme thinness has contributed materially to the substantial expense of these bands, and has contributed to the delicateness of the bands producing a propensity to readily break under the stresses created in the prior machines.

In such prior machines, the heater bars for supplying heat to the bands have been mounted to be stationary with respect to the frame of the machine, and, in such instances, the heater bars must be located so that they will be close to the traveling bands, but allowance must be made for the thickness of the film material as well as some additional spacing so that the film material will not produce jamming of the machine in the event that wrinkles or multiple thicknesses of film material are encountered.

In other instances, the heater bars are mounted on springs relative to the machine so that the entire heater bar is movable inwardly and outwardly for applying pressure against the moving band and the film material being heat sealed so that the sealing is effected under compressive pressure and further, some allowance is made for the heater bars to separate from each other and allow the bands to separate from each other when wrinkled portions of the film or multiple thicknesses of the film pass through the machine during sealing. Under these circumstances, there is essentially no uniformity in the amount of pressure which is being applied to the laminae being sealed. The pressure being applied is either too little or too much. This problem of pressures becomes extremely acute because of the warping or wrinkling of the metal bands after they have been used for a short period of time. The metal bands, by reason of the wrinkling or transverse bowing, occupy space which is intended to accommodate wrinkles in the film, and the heating bars must be relocated or adjusted from time to time.

Additionally, in such prior machines, the life of the very thin bands that have been required has been adversely affected by the obstacles which are encountered along the heating and cooling runs of the bands. The band mounting wheels are allowed to remain sufficiently apart so that multiple thicknesses of the bag material can be passed between the wheels, but, in most cases, the heater bars and then the cooling bars along the runs of the bands will guide the metal bands into more closely spaced relation with each other. At the particular location wherein the metal bands first encounter the heater bars, the metal band is suddenly guided around a corner of small radius, thereby bending the band. This same occurrence happens at the downstream end of the heating bar, and then again at the leading end of the cooling bar, and again at the trailing end of the cooling bar. This rather constant bending of the band as it travels along the film sealing run continuously works the band so as to adversely affect the band life. When this working is compounded with the continual warping or bowing, the shortening of the band life is compounded.

SUMMARY OF THE INVENTION

According to the present invention, the band sealer is improved by employing aligned and tandemly arranged heating and cooling bands. One pair of bands applies the sealing heat to the film laminae being sealed; and another pair of similar bands receive and cool the film laminae after the two have been sealed together and for hardening the seal which has been produced. The heating bands are arranged so that the runs of these bands, along which the sealing of the film laminae occurs, are essentially perfectly straight from one end to another so that inward guiding or deflection of the bands along these runs is unnecessary in sealing the film laminae therebetween. In order to accomplish this arrangement of the sealing runs of the bands, the band mounting wheels at each end of the runs are located in offset relation with each other; that is to say, that the mounting wheel for one band is disposed in slightly spaced relationship to the mounting wheel for the other band and in a direction along the runs of the band. In this way, the bands may be allowed to lie perfectly parallel with respect to each other and straight from one end to another. Of course, the other mounting wheels at the other ends of the heating bands are similarly offset. Similarly, the mounting wheels for the cooling bands are offset so that the film-engaging runs of the cooling bands also extend perfectly straight from one end of the cooling runs to the other end.

Neither the heating bands nor the cooling bands are subjected to wide ranges of temperature variations in each cycle of travel, and instead of deforming by warping or becoming corrugated, the bands remain flat to easily lie flush against the film being sealed.

Because the heating and cooling runs of the separate bands extend substantially perfectly straight and parallel to each other, the bands will normally lie flat and flush against the film laminae therebetween and no significant pressure is necessary in order to obtain a flush surface-to-surface engagement between the bands and the film laminae being sealed. The heat is supplied to the heating runs of the heating bands by yieldable heat transfer elements which are movable toward and away from the bands and which are tiltable to oblique angles with respect to the length of the heating runs, by means of very light springs which are sufficiently light as to serve primarily to cause the heat transfer elements to merely touch the heating bands. The movable heat transfer elements receive their heat from stationary heater bars which are spaced from and extend along the heating runs of the bands. In a similar way, the cooling is effected along the cooling runs of the cooling bands, and the heat is withdrawn by the plurality of heat transfer elements each of which is supplied with only sufficient pressure as to cause it to lie flush against the flat side of the cooling band. The heat withdrawn from the seal during the hardening process is transferred through the cooling runs of the cooling band and into the heat transfer elements, from which the heat is transferred into the stationary cooling bars which are cooled in a conventional way by cooling liquid passing therethrough at a temperature of conventional tap water or somewhat cooler.

The film-engaging runs of the cooling bands exert no significant pressure on the film laminae passing therebetween. As a result, heat will be withdrawn from the sealed area of the film laminae while the film is allowed to undergo physical changes in the seal area without the previous constraints. As a result, the film laminae shrinks slightly in a direction across the width of the seal area and at the same time expands slightly in a direction through the thickness of the seal area, producing a shrink seal. The heat transfer elements at the cooling section are somewhat wider than the width of the seal zone of the film to embrace adjacent non-sealed areas of the film. This will accommodate use of certain reprocessed films that may not grow in thickness, and the wider width of the heat transfer elements at least prevents seals in such films from being reduced in thickness. As a result, no shear lines are formed at abrupt changes in thickness and a very strong seal results. The bags emerging from this sealing machine can be immediately rough-handled without fear of damaging the seal which has just been produced.

The heat transfer elements in the heating section have a width less than half the width of the heating bands, and engage the heating bands entirely within the lower half of the width of the band. As a result, when the release agent coating (TEFLON) on the band becomes worn, the band may be reversed to provide an entirely new area of the release agent to confront the seal zone of the film.

BRIEF DESCRIPTION OF DRAWINGS

FIG. 1 is a perspective view, partly broken away for illustration of detail, of the machine;

FIG. 2 is an enlarged top plan view of the sealing machine, partly broken away for clarity of detail;

FIG. 3 is an enlarged detail section view taken approximately at 3—3 of FIG. 2;

FIG. 4 is a detail elevation view of one of the band heating assemblies as viewed at approximately 4—4 in FIG. 3;

FIG. 5 is an enlarged detail elevation view, with portions broken away for clarity of detail of the heat transfer mechanism, as viewed at approximately 5—5 in FIG. 3;

FIG. 6 is an enlarged detail section view taken approximately at 6—6 in FIG. 5;

FIG. 7 is an enlarged detail bottom plan view with the cover removed, and as viewed at approximately 7—7 of FIG. 6;

FIG. 8 is an enlarged detail section view taken approximately at 8—8 in FIG. 2;

FIG. 9 is a greatly enlarged detail section view through the seal produced in a polyethylene bag; and FIG. 10 is an enlarged detail section view through the bands, heat transfer elements and the film laminae in which the seal is being produced.

DETAILED DESCRIPTION OF THE INVENTION

A preferred form of the invention is illustrated in FIGS. 1 - 10 and the sealing machine is indicated in general by numeral 10, and includes a frame 11 carried on upright posts 12 by releasable brackets 13 so that the sealing machine as a whole may be adjusted vertically. The posts and standards 12 may be independently supported by floor mounted bases and arranged in such a way that a bag-supporting belt conveyor to carry the weight of the bags being sealed may be extended along and beneath the sealing machine 10.

The general form of the machine may be arch-shaped so as to suspend the base plates 14 in horizontal position and in spaced edge to edge relation with respect to each other to define a bag top or film-receiving slot 15 therebetween throughout the entire length of the machine.

The sealing machine is substantially entirely enclosed by a shroud or cover 16 for safety purposes and, in FIGS. 1 and 2, the cover is broken away to show the necessary parts of the machine for a complete understanding of it.

A bag top conveyor is provided and provides a pair of endless conveyor chains 17 trained about sprockets 18 and 19 at opposite ends of the frame plates 14. The chains 17 extend in linear confronting runs 17a along the slot 15 between the base plates to receive, clamp, grip and convey and discharge the tops of bags B passing through the machine. The runs of the chain are maintained in predetermined spacing with respect to each other for exerting pressure on the bag material by spring pressed guides.

Power for the drive chains is supplied from a motor 21 through a gear case 22 and through a chain and sprocket 23 to a shaft 24 for one of the chain sprockets 18. Power is transferred to the other sprocket 18 through suitable drive gears on the shafts 24 and 25, the latter of which drives the other sprocket 18.

The sealing machine has a heating station 26 and a cooling station 27, both arranged along the linear runs 17a of the conveyor chain in tandem relation to each other, the heating station 26 is disposed adjacent the bag-receiving end of the bag conveyor and the cooling station is disposed between the heating station 26 and the bag discharging end of the chain conveyor.

The heating station comprises a pair of elongate and endless heating bands 28, 28.1 which are arranged substantially horizontally, immediately above the linear runs 17a of the conveyor chains. The bands 28 are trained around the mounting wheels 29, 29.1; and the band 28.1 is trained around mounting wheels 29,2, 29.3. The several band mounting wheels are carried on stub shafts 29.4 journaled in suitable bearings on the base plates 14.

It will be recognized that the heating bands 28, 28.1 have linear, straight and parallel heat transfer runs extending along each other and lying flat and in flush engagement with each other entirely from end to end. The adjacent ends of the heat transfer runs 28a and 28.1a are offset or staggered slightly with respect to each other in the direction of movement of the bands along the run.

The adjacent band mounting wheels are similarly offset in the direction of the runs. The wheels 29 and 29.2 are not directly opposite each other, but are located so that a line interconnecting the axes of the wheel 29 and of the adjacent wheel 29.2 extends obliquely of the linear runs of the heating bands (instead of extending normal to the runs). The band mounting wheels 29.1 and 29.3 are similarly located with respect to each other so as to be slightly offset or in slightly staggered relation with each other in a direction along the heat transfer runs of the bands. The purpose of the offset is to provide more space between the peripheries of adjacent wheels while facilitating positioning of the heat transfer runs 28a, 28.1a to lie in flush engagement with each other, while still allowing bags of varying thicknesses to be accommodated.

The heating bands 28, 28.1 are formed of heat conductive material, generally steel, but may be formed of other materials such as fiber glass. Steel bands may be approximately 1 inch wide and are preferably approximately 0.005 inches in thickness. The outer surfaces of the bands which confront each other along the linear bag heating runs and which engage the polyethylene film material, are coated with a suitable release agent to prevent sticking between the heated bands and the film laminae. The bands may be coated with a very thin coating of a very slippery plastic, such as a material known by its trademark TEFLON, fixedly secured to the face of the bands.

The heating station 26 includes a pair of identical heater bars 30 for supplying heat which is to be transmitted through the heating bands to the film laminae being sealed. Such identical heater bars 30 are disposed at opposite sides of the bands and confront the linear runs of the bands. The heater bars 30 are preferably made of steel and are suitably mounted on upstanding appendages or ears 14.1 which are a part of brackets 14.2 affixed to the frame plates 14. Heat insulating spacers 14.3 are positioned between the upstanding appendages and the heater bars. Although the bracket 14.2, which is ordinarily secured to the frame plate 14 by means of screws, may be slightly loosened and then retightened, the bracket 14.2 and the heater bars 30 ordinarily are stationary with respect to the frame plate 14 and with respect to the adjacent runs of the bands.

Each of the heater bars 30 has an elongate opening 31 extending longitudinally throughout the length thereof, and an electric heating element 32, or other source of heat, extends through the opening 21 for applying heat to the heater bar for transfer to the film laminae. Each of the heater bars has an elongate slot 33 extending throughout the length of the bar, an opening through the side face 34 of the bar which confronts the bands 28, 28.1.

A plurality of heat transfer slides 35 are mounted in the slot 33 in close fitting, but freely slidable and tiltable relation. The slides 35 are in the shape of rectangular blocks and may be formed of copper, brass, carbon, or other readily heat conducting materials of such a nature as to minimize wear as the bands 28, 28.1 travel along the slides continuously. The slides 35 are spaced from each other in the slots 33, and the ends of the slides 35 are guided for inward and outward movement by pins 36 which protrude, within the slots 33, toward the bands 28, 28.1. The pins 36 are affixed, immovably, in the heater bars 30.

The slides 35 lie substantially horizontally, and the top and bottom faces of the slides lie substantially flush with the confronting sides of the slot 33 for rather efficient heat transfer. Each of the slides 35 has an aperture 35.1 extending transversely therethrough and a readily removable retainer pin 37 in the aperture protrudes into one of the plurality of openings 38 formed in the adjacent heater bar 30. The pin 27 is free to move about in the opening 28 as the slide moves inwardly and outwardly transversely of the bands 28, 28.1 and as the slide 35 tilts to various angles as illustrated in FIG. 5. However, the pins 37 prevent the slides 35 from dropping out of the heater bars 30. A cover plate 39 underlies each of the bars 30 and is removably retained on the heater bar as by screws and may be readily removed for withdrawing the pins 37 which facilitates ready removal and replacement of the slides 35 as they wear or as different types of slides 35 are to be substituted.

Each of the slides 35 is continuously urged outwardly toward the adjacent sealing band 28, 28.1 by a slide rod 40 which protrudes rearwardly through a bearing aperture 30.1 in the heater bar 30. Each of the rods 40 protrudes into the end of a compression spring 41 and has a stop ring 40.1 affixed thereto to bear against the spring. The spring 41 allows rearward movement of the rod 40 and slide 35 away from the heater bands, but continuously applies pressure against the slide 35 and through the bands 28, 28.1 against the film laminae being sealed. The rear ends of springs 41 fit into adjustment screws 42 threaded into the bracket 14.2 on the frame so as to regulate the amount of pressure applied by the springs on the slides 35. The strength of the springs 41 is minimal and serves only to continuously maintain the slides 35 in engagement with the adjacent band, but no significant pressure is applied from the springs 41 to the laminae of the bags being sealed. The flat front face of each slide 35 lies flush against the flat band for efficient heat transfer.

In the event that the thickness of the film laminae varies slightly from one location to another or as the edge of a bag is passing through the machine, slides 35 will be free to move inwardly and outwardly relative to the film laminae to maintain engagement with the bands for continued transfer of heat to the bands, while accommodating any variances in thickness by being free to tilt as illustrated in FIG. 5. As will be hereinafter more fully explained, the heating bands 28, 28.1 remain very nearly flat without warping, bowing, or otherwise deforming into corrugated or washboard shapes or otherwise, the front flat surfaces of the slides 35 maintain flush engagement with maximum areas of the bands for most efficient transfer of heat to the film laminae being sealed. It will be recognized in FIG. 3 that the heat transfer elements or slides 35 engage the adjacent bands across only a small portion of the entire width of the bands, and entirely within the lower half of the band width and spaced inwardly from the edges thereof. The slides are typically ¼ inch wide for bands of one inch width. Wearing of the coating of release agent on the band may be experienced along the heated or sealing zone defined by slides 35; whereupon the band may be reversed so that the slides 35 again engage the band entirely within the lower half of the band width. If the thickness of the material being used in the bags varies slightly, no adjustment of the mechanism is required because the apparatus is self-adjusting to accommodate various thicknesses of laminae.

The cooling station 27 of the sealing machine is provided with a pair of endless cooling bands 45, 45.1 which have confronting linear heat transfer runs 45a, 45.1a disposed above the chains 17 and slot 15 for engaging the plastic film and cooling the seal area and removing heat therefrom. The endless bands 45, 45.1 are illustrated in FIG. 2 to be continuous in nature and constructed of heat conductive material such as steel. The steel bands 45, 45.1 may be approximately one inch wide and approximately 0.008 inches in thickness. The bag-engaging faces of the bands 45 need to release agent thereon. The bands 45 are trained around mounting wheels 46, 46.1 on shafts 47; and the band 45.1 is trained around mounting wheels 46.2, 46.3 on shafts 47, all of which are journaled in suitable bearings on the frame plates. The heat transfer runs 45a and 45.1a lie flush against each other from end to end and extend straight and parallel with respect to each other. The adjacent ends of the heat transfer runs 45a and 45.1a are offset slightly with respect to each other in a direction along the runs. The adjacent mounting wheels 46 and 46.2 are also slightly offset with respect to each other, and the other adjacent mounting wheels 46.1 and 46.3 are also offset with respect to each other. This offsetting of the mounting wheels in a direction along the runs, allows the heat transfer runs 45a, 45.1a of the bands to lie flush against each other from end to end.

The cooling of the bands 45, 45.1 is effected by a pair of cooling bars 30.2, which are constructed and arranged very nearly identically to the heating bars 30 with exceptions hereinafter noted, and which are provided with similar, but slightly wider (typically one-half inch wide) heat transfer elements or slides 35', confined and guided in slots 33 as previously described, and having retainer pins 37 confined by a cover plate 39, and slide rods 40 exerting spring pressure against the heat transfer elements 35 from springs 41 which are anchored against adjustment screws 42 threaded into the stationary bracket 14.2 on the frame plates 14. It will therefore be seen that the heat absorbing apparatus at the cooling station 27 is substantially the same as the heating apparatus at the heating station 26, and all of the parts thereof are the same with the exception of slight differences in the heat absorbing or cooling bar 30.2 as compared to the heating bar 30. The cooling bar 30.2, as illustrated in FIG. 8, has an internal passage 31 like that of the heating bar, but in the case of the cooling bar 30.2, the passage 31 is to be filled with a cooling fluid F such as tap water which is supplied to the cooling bar through a supply hose and hose fittings $H_1$ on the cooling bar 30.2. Except for the fact that cooling fluid F flows through the passage 31, and removes heat from the heat transfer elements 35′ which accordingly will remove heat through the cooling bands 45, 45.1 from the film laminae, the mechanism and transfer of heat at the cooling station operates essentially identically with the structure mechanism at the heating station 26.

The band wheels are driven by superposed gears 50 and chains and sprockets 51 from motor 21.

It is emphasized that at the cooling station 27, the springs 41 produce only a minimum of inwardly directed pressure exerted upon the heat transfer elements or slides 35 so as to cause the flat edge surfaces of the slides 35 to be maintained in flush engagement with the flat sides of the heat transfer runs of the cooling bands. The pressure exerted by the springs 41 of the cooling section is sufficiently minimal as to allow the runs of the bands to separate slightly from each other under the influence of the formation of a shrink seal S in the film laminae being sealed together. Such a shrink seal is illustrated in FIGS. 9 and 10 wherein the thickness of the polyethylene material in the seal S is significantly greater than the combined thicknesses of the film laminae of the bag which are welded together in making such a seal. Along with the forming of such a seal, the width of the seal is somewhat less than the width of the heat zone at which the laminae were welded or fused together. When the softened or semi-molten material of the laminae which has been heated at the heating station 26 passes by the discharge end of the heating runs 28a, 28.1a, the seal S immediately begins to form and th thicken to the approximate proportional dimensions illustrated in FIG. 9. As the seal initially engages the cooling bands 45, 45.1, the heat transfer runs of the cooling bands are permitted to separate slightly under influence of the seal S and without such pressure as might otherwise tend to prevent the transverse growth of the seal. The cooling bands in the heat transfer runs 45a, 45.1a will "kiss cool" the shrink seal produced with an absolute minimum of pressure while maintaining flush engagement along the length of the heat transfer runs.

The result of the formation of the shrink seal and the kiss cooling is that the seal produced between the laminae of the bag is substantially completely hardened when the bag is discharged from the sealing machine so that the bags may be immediately rough-handled and no provision need be made for a significant amount of storage space near the discharge end of the machine for the bags.

The heat transfer elements or slides 35′, being significantly wider than the slides 35 of the heating station 26, and of the width of the seal zone in the film, span entirely across the seal zone of the film and confront the adjacent non-heated portions of the film. In films of low quality or of reprocessed material which will not grow in thickness to produce a shrink seal, the slides 35′ will not cause any reduction in thickness during curing or cooling.

The sealing machine according to the present invention has three significant aspects which intimately cooperate with each other to produce high quality seals in polyethylene bags at a rapid rate and without significant down time otherwise experienced in sealing machines.

The principal cooperating aspects include (1) the separate heating bands 28, 28.1 and the separate cooling bands 45, 45.1, spaced slightly from each other longitudinally of the sealing machine, and (2) the heat transfer funs of both the heating bands and cooling bands have their extreme ends offset or staggered in a direction along the runs with respect to each other, thus allowing the heat transfer runs to extend straight and parallel and to lie flush against each other, while still allowing entrance of the bags tops being sealed adjacent the band mounting wheels which are also offset or staggered with respect to each other, and (3) the use of the stationary heat generating and absorbing bars and the plurality of very lightly spring pressed heat transfer elements maintained in continuous flush engagement with the flat sides of the heating and cooling bands.

In this sealing machine, the linear speed of the heating bands 28, 28.1 and of the cooling bands 45, 45.1 and of the conveyor chains 17 are all identically the same and typical band speed will be approximately 600 inches per minute, up to 800 inches per minute. This speed of operation provides for sealing 18 to 22 50 pound bags per minute, which bags may be 16 to 18 inches wide. The heating bars 30 are maintained at temperatures, typically in the range of 350° F., but where slow speeds are being utilized, temperatures at the heating bars 30 may be in the range of 290° F. Water used for cooling in the cooling bars 30.2 may vary in temperature, depending on available water and circumstances, but typically, tap water is used and its temperatures may run 50° to 70° F. Although the nature and thickness of the bags being sealed may vary widely, the bag material is typically polyethylene film with a thickness of 6 to 8 mils for each ply or laminae; generally a seal is made between two plies or laminae of film material, but some bags will have a gusseted side edge where four plies or laminae of material are sealed together. By virtue of the present construction, band life is extended by five to ten times longer than has previously been experienced with prior machines. Although the thickness of the bands has been significantly reduced, it can be expected that the life of the heating bands at the heating station can be extended by at least five times to 200 hours or more; and the life of the cooling bands at the cooling station can be extended by ten times or more to upwards to 400 hours of life.

It will be recognized that because of the separate heating bands and separate cooling bands, the heating bands need not be subjected to such high temperatures; and the heating bands, when first engaging the bag tops, are already heated from the previous cycle so that the bag tops can be somewhat preheated; and because the temperature differential between the hottest part of the heating bands and the coolest part of the heating bands is not great, there will be a minimum of warping and bowing and corrugating, if any, of the bands due to the heating.

Similarly, at the cooling station 26, the cooling bands are maintained in a chilled condition so that the seal being formed will shrink fast and harden almost immediately upon encountering the cooling bands at the cooling station. It has been observed that whereas the heated zone, across which the seal is made in the laminae, is approximately one-fourth of an inch wide, the seal immediately shrinks to approximately three-sixteenths of an inch wide as it progresses through the cooling station. This construction in the width of the seal zone, emphasizes that the film material does in fact shrink in a direction transversely of the seal zone, and as this shrinking occurs, the thickness of the seal increases as illustrated in FIGS. 9 and 10.

As in the case of the heating bands, the cooling bands are also maintained within a reasonably small range of temperatures throughout their complete operating cycles, and therefore neither are the cooling bands subjected to any significant stresses due to sudden temperature changes, which, of course, adds materially to the life of these cooling bands.

It is significant that the heat transfer runs 28a, 28.1a of the heating bands and the heat transfer runs 45a, 45.1a of the cooling bands have their ends offset with respect to each other in the direction of the movement of the conveyor and bands through the machine. The offset relationship of the ends of the runs of the bands allows the bands to lie flush against each other from end to end, while still allowing the necessary separation of the bands as the bag tops progress through the machine for sealing and cooling. The offset relationship of the band mounting wheels allows adequate space to admit the bags between the offset wheels and between the bands so that their thicknesses can be accommodated.

Another significant aspect of the offset relationship of the heat transfer runs of the bands is that these heat transfer runs of the bands are not, in the ordinary course of their movement, guided around any sharp or stationary edges which might otherwise tend to produce a permanent set or deformation of the band. The inner face of each of the bands assumes a concave orientation as it moves around the mounting wheel, but at essentially nowhere along the length of the heat transfer runs does the band again assume any kind of a concave configuration nor is the band guided around a turn or curvature with a concave orientation. As the heat transfer run of the band travels from one mounting wheel to the other, the band remains essentially straight, parallel and substantially flush against the other confronting band except for the slight thickness of the laminae being sealed therebetween.

Of course, this gentle handling of the bands as they travel at a rapid rate through the heat transfer runs contributes materially to extending the band life of these rather delicate and very thin bands.

In addition, the fact that the heater bars 30 and the cooling bars 30.2 are completely stationary on the frame and do not bear against the heat transfer runs of the bands also contributes to extended band life. The heat is transferred by the plurality of small and light weight heat transfer elements or slides which are urged against the bands with only sufficient spring pressure as to assure that the front flat faces of the heat transfer slides maintain flush engagement with the flat faces of the adjacent bands.

Because the spring pressure against the slides or heat transfer elements is extremely light, but adequate, the separation of the bands encounters essentially no resistance to accommodate wrinkles or other thicknesses of the film material and therefore the transfer of heat to and from the heating and cooling bands by the heat transfer elements or slides minimizes any damaging influence or wear on the bands.

It will be seen that we have provided a new and improved sealing machine with separate heating and separate cooling bands, the heat transfer runs of both the heating and cooling bands have offset ends in a direction along the runs, allowing the heat transfer runs of the bands to lie flat and flush against each other from end to end; at both the heating station and cooling station adjacent the heating and cooling bands, stationary bars are provided for applying sealing heat and absorbing heat, the heat being transferred between these stationary bars and the traveling bands by a plurality of very lightly spring pressed heat transfer elements.

What is claimed is:

1. A sealing machine for closing and sealing polyethylene bags by welding together film laminae forming the ends of the bags, comprising:
    an elongate frame,
    a bag top conveyor on the frame and including a pair of horizontally oriented endless conveyor chains with elongate bag conveying runs confronting each other and cooperating with each other to receive, grip, carry and discharge the ends of the bags,
    a pair of endless heating bands and a pair of endless cooling bands, the heating and cooling bands being disposed adjacent the receiving and dishcarge ends, respectively, of the conveying runs, and said bands having heat transfer runs extending along the conveying runs and engaging and confining the film laminae of the bag,
    mounting means including wheels on the frame, mounting such heating and cooling bands in spaced and end to end relation with each other, the adjacent ends of the heat transfer runs being offset with respect to each other in a direction along the runs, the band mounting wheels being similarly offset,
    heat generating and absorbing means adjacent the heating and cooling bands, respectively, and including a pair of rigid stationary bars on opposite sides of one of the heat transfer runs, each of the bars having a plurality of heat transfer elements slidable thereon and engaging the flat side of the adjacent band, the elements being individually movable toward and away from the bands and being obliquely tiltable about axes extending transversely of the band and generally parallel to the flat sides of the bands, said pair of bars including means maintaining the temperature thereof, and
    springs urging said heat transfer elements toward the heat transfer runs of the adjacent bands, said springs being yieldable under the influence of film laminae passing between the bands which bear outwardly against the heat transfer elements and allow separation of the bands to allow the film laminae being sealed to pass along the linear runs.

2. The sealing machine according to claim 1 and said heat transfer runs of adjacent bands lying substantially flush against each other from end to end.

3. The sealing machine according to claim 1 and said means maintaining the temperature of the bars adjacent the cooling bands including a hollow passage through the bars and fittings attached to the bars for connection to cooling fluid ducts.

4. The sealing machine according to claim 1 and the heat transfer runs of both the heating and cooling bands having such offset ends, and there being rigid stationary bars with such heat transfer elements and such springs adjacent the heat transfer runs of both the heating bands and the cooling bands.

5. The sealing machine according to claim 1 and there being a pair of rigid stationary bars with such heat transfer elements adjacent the heat transfer runs of both the heating bands and cooling bands.

6. The sealing machine according to claim 5 wherein each of the heat transfer elements engaging the heating bands has a width significantly less than one-half the width of the adjacent heating band and engages the heating band entirely within the lower half of the width of the heating band.

7. The sealing machine according to claim 6 and each of the heat transfer elements adjacent the cooling bands having a width substantially in excess of the width of the heat transfer elements adjacent the heating bands and substantially in excess of one-half the width of the adjacent cooling band.

8. A sealing machine for closing and sealing polyethylene bags by welding together film laminae forming the ends of the bags, comprising:

an elongate frame, a bag top conveyor on the frame and including a pair of horizontally oriented endless conveyor chains in side by side relation with each other and defining elongate bag conveying runs confronting each other and cooperating with each other to receive, grip, carry, and discharge the ends of the bags in upright condition, a pair of endless heating bands and a pair of endless cooling bands, the heating and cooling bands being disposed adjacent the receiving and discharge ends, respectively, of the conveying runs, said bands having heat transfer runs extending along the conveying runs and engaging and confining the film laminae of the bag, the heat transfer runs of the heating bands being straight and parallel and lying flush against each other from end to end, the heat transfer runs of the cooling bands also being straight and parallel and lying flush against each other from end to end, mounting means including wheels on the frame and mounting such heating and cooling bands in spaced and end to end relation with each other, the adjacent ends of the heat transfer runs in the heating bands and also in the cooling bands, being offset with respect to each other in a direction along the runs, the band mounting wheels being similarly offset whereby adjacent band mounting wheels have their respective points of tangency to the respective bands spaced from each other in the direction of said heat transfer runs, heat generating and absorbing means adjacent the heating and cooling bands respectively, and including a pair of rigid stationary heating bars on opposite sides of the heat transfer runs of the heating bands and also including a pair of rigid stationary cooling bars on opposite sides of the heat transfer runs of the cooling bands, each of said heating bars and cooling bars having a plurality of heat transfer elements slidable thereon and engaging the flat side of the adjacent band, said heat transfer elements being movable toward and away from the bands and being obliquely tiltable about axes extending transversely of the bands and generally parallel to the flat sides of the adjacent band, electric heaters on said heating bars and generating heat therefor, said cooling bars having cooling fluid passage means therein to provide for dissipation of heat, and springs urging said heat transfer elements toward the heat transfer runs of the adjacent bands and being yieldable under influence of the film laminae passing between the bands to allow outward movement of the heat transfer elements with separation of the bands and oblique tilting of such heat transfer elements to conform to the localized orientation of the bands as the bags pass therebetween, said springs producing return of the transverse movement and oblique orientation of the heat transfer elements to maintain the heat transfer elements in flush engagement with the bands and to return the bands to lie flush against each other subsequent to passage of the bag from the heat transfer runs.

* * * * *